United States Patent
Yip et al.

(10) Patent No.: US 7,916,406 B2
(45) Date of Patent: *Mar. 29, 2011

(54) MAGNIFIER WITH SLIDABLE COVER

(75) Inventors: Gin Fai Yip, North Point (HK); Bryan Yip, Kowloon (HK)

(73) Assignees: Carson Optical, Inc., Hauppauge, NY (US); Leading Extreme Optimist Industries, Ltd., Chai Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/039,393

(22) Filed: Feb. 28, 2008

(65) Prior Publication Data

US 2008/0218880 A1 Sep. 11, 2008

Related U.S. Application Data

(63) Continuation-in-part of application No. 11/715,737, filed on Mar. 7, 2007, now Pat. No. 7,414,798.

(51) Int. Cl.
*G02B 27/02* (2006.01)
(52) U.S. Cl. .................................................. 359/802
(58) Field of Classification Search .................. 359/718, 359/796, 798, 800, 802, 803, 808, 810, 813
See application file for complete search history.

(56) References Cited

U.S. PATENT DOCUMENTS

| | | | |
|---|---|---|---|
| 4,037,940 A | 7/1977 | Yates et al. | |
| 5,642,234 A * | 6/1997 | Altman et al. | 359/802 |
| D394,272 S | 5/1998 | Hon | |
| 5,754,349 A | 5/1998 | Hon | |
| D494,692 S | 8/2004 | Jim | |
| 6,822,813 B2 | 11/2004 | Jim | |
| D530,353 S * | 10/2006 | Jarosinski et al. | D16/135 |
| 7,178,847 B1 * | 2/2007 | Mui | 294/99.2 |

* cited by examiner

*Primary Examiner* — Scott J Sugarman
*Assistant Examiner* — Vipin M Patel
(74) *Attorney, Agent, or Firm* — Carmody & Torrance LLP (57) ABSTRACT

A magnifying assembly, the magnifying assembly comprising a housing comprising a frame to which a magnifying lens is secured; and a battery compartment; a cover assembly slidable along the housing; wherein the cover is slidable relative to the housing in a first direction so as to cover at least part of the magnifying lens and slidable relative to the housing in a second direction so as to expose the magnifying lens; and wherein the distance between the battery compartment relative to the magnifying lens remains the same regardless of whether the cover slides relative to the housing in the first direction so as to cover at least part of the magnifying lens or slides relative to the housing in the second direction so as to expose the magnifying lens.

13 Claims, 7 Drawing Sheets

MAGNIFIER WITH SLIDABLE COVER

CROSS REFERENCE TO RELATED APPLICATIONS

This is a continuation in part of application Ser. No. 11/715,737, filed Mar. 7, 2007 now U.S. Pat. No. 7,414,798. The disclosure of application Ser. No. 11/715,737 is incorporated by reference as if fully set forth herein.

BACKGROUND OF THE INVENTION

The present invention relates generally to magnifiers and in particular, to a magnifier with a slidable cover that achieves an improved overall compact construction, among providing other features and advantages.

The prior art has examples of "pop-up" type magnifiers, examples of which are described in U.S. Pat. Nos. 6,822,813; 5,754,249 and D394,272. However, it is believed that there are deficiencies in the prior art that would be desirable to overcome.

For example, it is believed that the prior art devices do not minimize the otherwise necessary dimensions of the device. In addition, the prior art devices are perceived to have more moving parts than desirable and therefore may be more likely to break or malfunction, due to wear or the like.

As such, it would be desirable to provide a magnifying assembly that includes a cover that is retractable relative to the housing so as to expose the magnifying lens, while the size of the magnifying assembly does not change, length or widthwise, as set forth herein. In this way, an improved magnifying assembly may be provided.

Accordingly, further advances in the art are believed to be desirable. In particular, a magnifying assembly that overcomes the aforementioned deficiencies and achieves the aforementioned and below mentioned objectives is desirable, and believed to be provided by the present invention.

SUMMARY AND OBJECTIVES OF THE PRESENT INVENTION

It is thus an objective of the present invention to overcome the perceived deficiencies in the prior art.

For example, it is an objective of the present invention to provide an improved magnifying assembly that includes a retractable cover so as to expose the magnifying lens, while maintaining a minimal requirement of the size of the assembly itself.

It is another objective of the present invention to provide an improved magnifying assembly that includes a retractable cover so as to expose the magnifying lens, thereby reducing the number of moving parts and reducing the likelihood of breakage or malfunction of the assembly.

Yet a further objective of the present invention is to provide an improved magnifying assembly that is easier and relatively less costly to manufacture.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to a magnifying assembly. In a preferred embodiment, the magnifying assembly comprises a housing comprising a frame to which a magnifying lens is secured; and a battery compartment; a cover assembly slidable along the housing; wherein the cover is slidable relative to the housing in a first direction so as to cover at least part of the magnifying lens and slidable relative to the housing in a second direction so as to expose the magnifying lens; and wherein the distance between the battery compartment relative to the magnifying lens remains the same regardless of whether the cover slides relative to the housing in the first direction so as to cover at least part of the magnifying lens or slides relative to the housing in the second direction so as to expose the magnifying lens.

In yet an alternative embodiment of the present invention, the magnifying lens need not be placed in the frame. For example, the lens may be "rimless" and merely be coupled to the housing by a plastic coupling member or a screw, just to name but two of many examples. The important point therefore is that the magnifying lens does not move relative to the housing, such as the battery compartment, regardless of how the lens may be coupled and/or secured to the housing. Such is to be contrasted with the prior art devices whereby the lens may "pop-up" relative to the battery compartment and/or housing.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Reference is made generally to FIGS. 1-7 for a disclosure of a preferred embodiment of the present invention, which illustrates a magnifying assembly, generally indicated at 10.

Magnifying assembly 10, in a first preferred embodiment, comprises a housing generally indicated at 20, a magnifying lens 50 coupled to housing 20, and a cover assembly, generally indicated at 60, which is slidable along housing 20. In accordance with this preferred embodiment, cover assembly 60 is slidable relative to housing 20 in a first direction (see arrow "x" in FIGS. 1, 2) so as to cover at least part of magnifying lens 50 and slidable relative to housing 20 in a second direction (see arrow "y" in FIGS. 1, 2) so as to expose magnifying lens 50.

Figure 1:
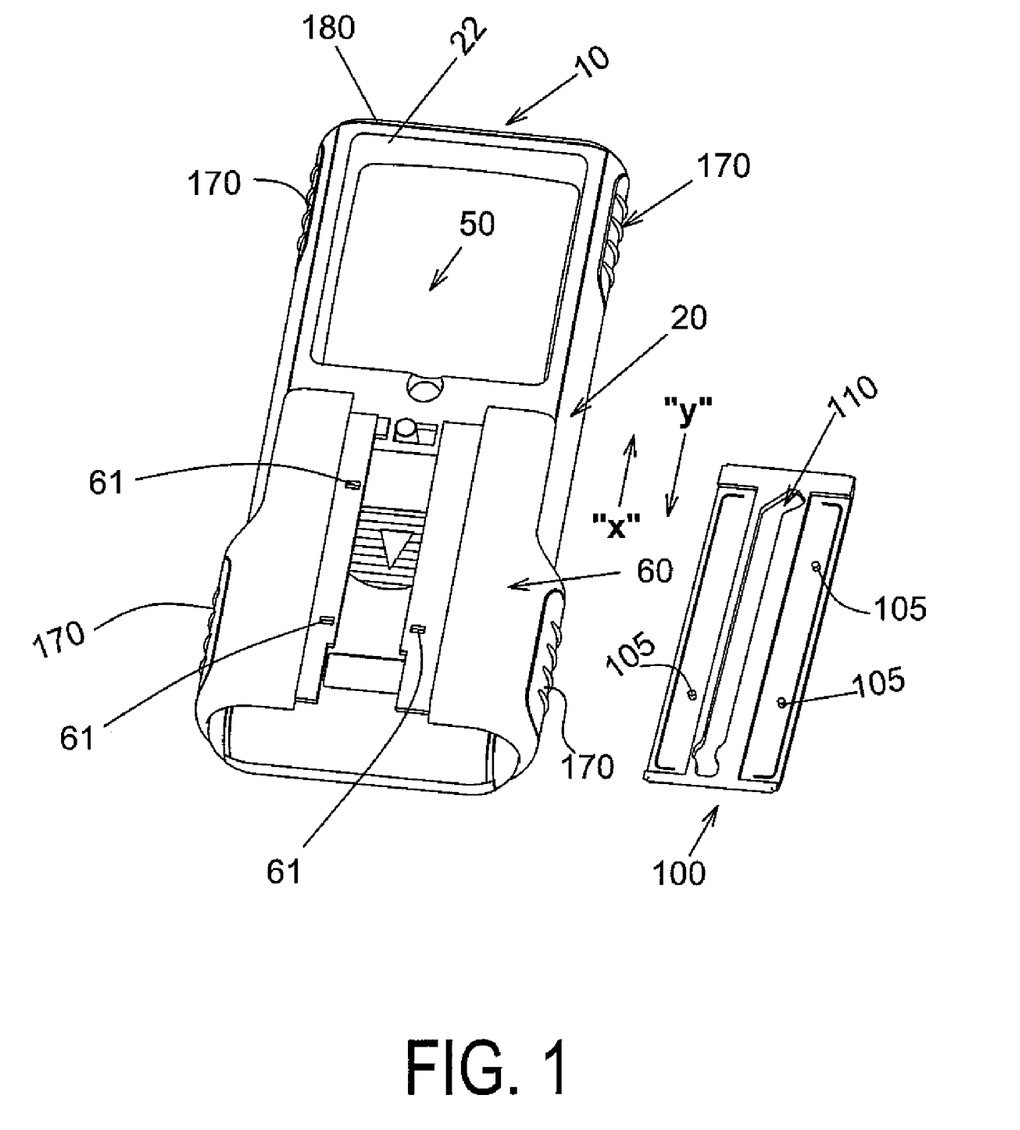
FIG. 1 is a perspective view of a magnifying assembly with a cover assembly in a retracted position (but with a cover plate removed and illustrating an underside thereof), all constructed in accordance with a preferred embodiment of the present invention.

FIG. 1 also illustrates a cover plate 100 that forms part of cover assembly 60. Cover plate 100 may be snap-fit onto cover assembly 60 by complementary use of tabs 105 into receptacles 61 on cover plate 100 and cover assembly 60, respectively. Alternatively, other coupling means could be used. Still further, it is very much contemplated that cover plate 100 is integrally formed with the cover assembly 60, as disclosed below. In accordance with a preferred embodiment, cover plate 100 comprises an elongated slot 110, the purpose of which will be disclosed below.

The Figures also illustrate that housing 20 of magnifying assembly 10 preferably comprises a frame 22 within which magnifying lens 50 is secured and a battery compartment 30. In the preferred embodiment, frame 22 and battery compartment 30 are integrally formed. In a specific embodiment, housing 20 is formed of plastic and frame 22 and battery compartment 30 are integrally formed (i.e. one continuous piece) from molded plastic. A plurality of batteries (not shown in FIG. 2 but shown in FIGS. 6, 7) are also provided as would be understood by one skilled in the art.

In accordance with an objective and advantage of the present invention, it can be seen from an understanding of the figures that frame 22 does not slide or move relative to battery compartment 30. In this way, upon the exposure of magnifying lens 50 (e.g. FIG. 1) the length of housing 20 does not change from when magnifying lens 50 was covered by cover assembly 60 (e.g. FIG. 2). Said another way, the distance between the battery compartment relative to the magnifying lens remains the same regardless of whether the cover assembly slides relative to the housing in the first direction so as to cover at least part of the magnifying lens or slides relative to the housing in the second direction so as to expose the magnifying lens.

Figure 2:
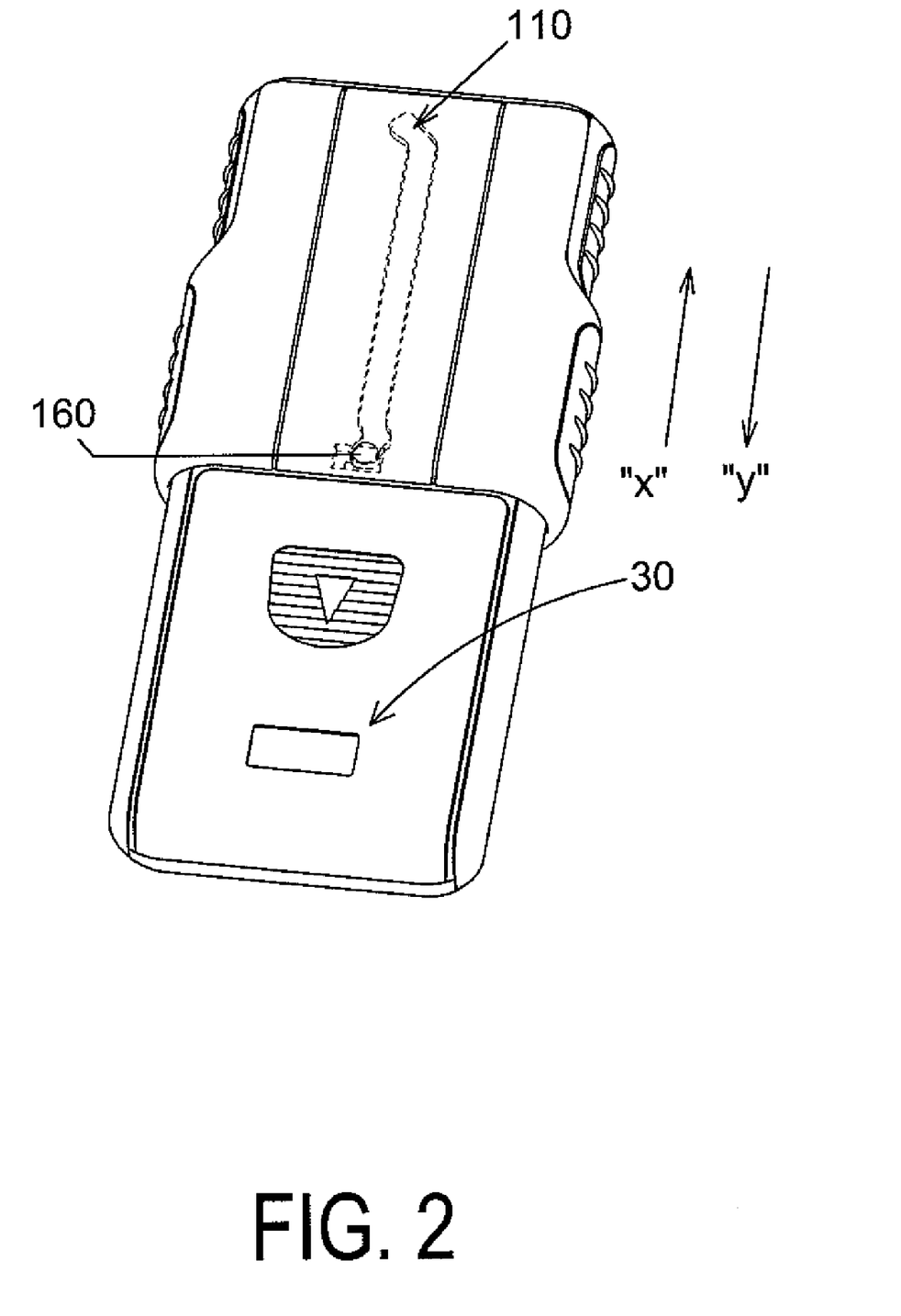
FIG. 2 is a perspective view of the magnifying assembly of FIG. 1, with the cover assembly (and cover plate in position) in a covered position.

In accordance with another objective and advantage of the present invention, an illumination device 80, such as an LED by way of example and not limitation, is provided. Reference may also be specifically made to FIGS. 6-7 for a preferred electrical circuit arrangement in connection therewith. In accordance with a preferred embodiment, illumination device 80 is coupled to housing 20, such as by mounting as would be well-known to one skilled in the art. Preferably, device 80 does not extend beyond the bottom surface of the housing 20; in this way it does not interfere with cover assembly 60 when it moves from its retracted position (FIG. 1) to a closed position (FIG. 2). A specific alignment of the LED can be found in co-pending application Ser. No. 11/715,737.

In accordance with the preferred embodiment illumination device 80 is coupled to first and second light terminals 82, 84. Of course, a commercial illumination device 80 itself may comprise such terminals 82, 84. Further, battery compartment 30 comprises first and second source terminals 32, 34. Second light terminal 84 may be electrically coupled to second source terminal 34, such as, for example, via a conductive element (e.g. wire 35) and a resistor element 36.

To complete the electrical circuit, a switch assembly 150 is provided for electrically coupling (and decoupling) first source terminal 32 and first light terminal 82. Switch assembly 150 also comprises a protrusion 160. As would be understood by those in the art, switch assembly 150 is configured such that when protrusion 160 is in a first position, first source terminal 32 is electrically coupled to first light terminal 82 and when protrusion 160 is in a second position, first source terminal 32 is electrically decoupled from first light terminal 82. In this exemplary way, when protrusion 160 is in the first position the illumination device 80 illuminates and when protrusion 160 is in the second position the illumination device 80 is not illuminated.

Figure 3:
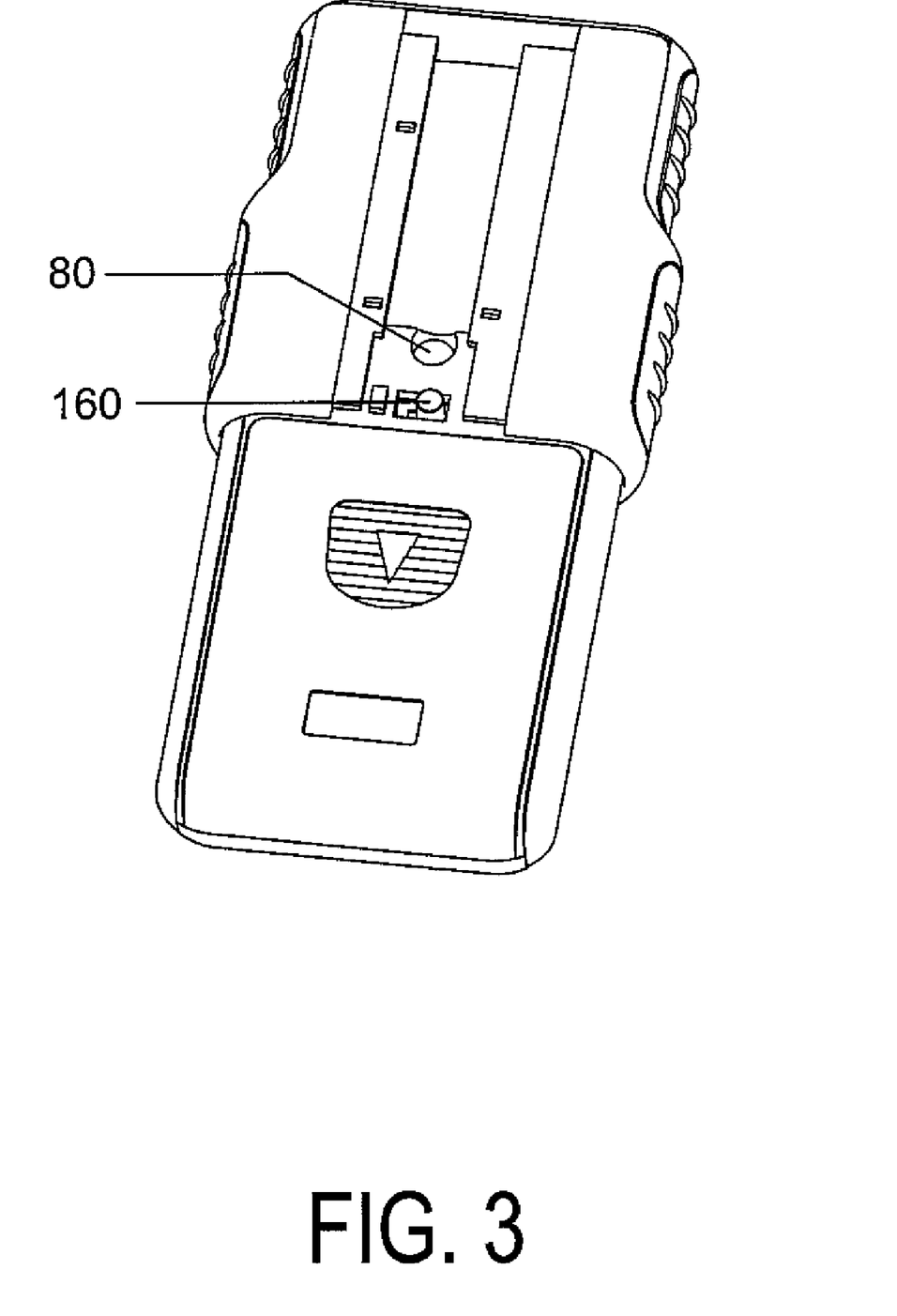
FIG. 3 is a perspective view of the magnifying assembly of FIGS. 1 and 2 (but with the cover plate removed and illustrating a topside thereof), with the cover assembly being in a covered position.
Figure 4:
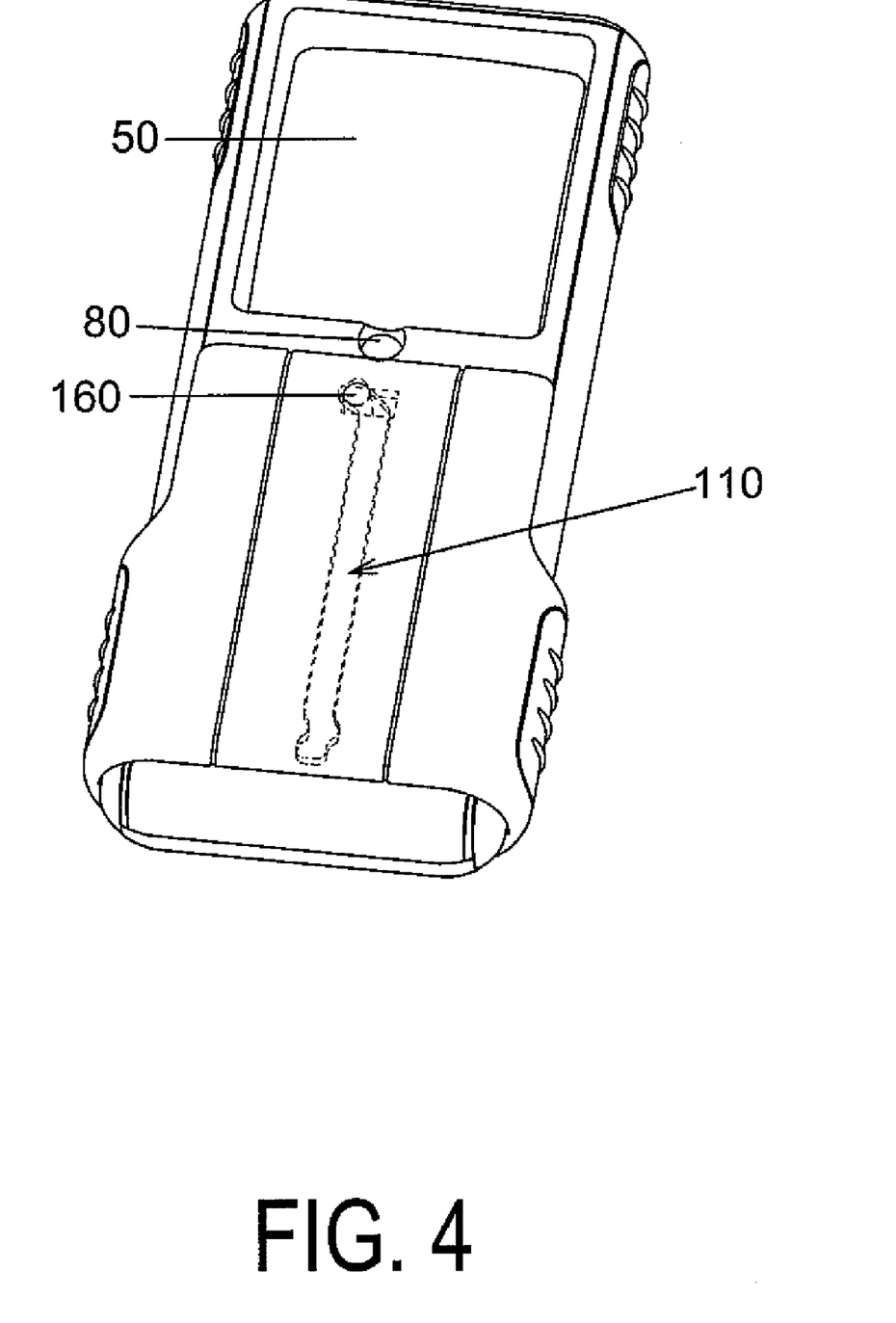
FIG. 4 is a perspective view of the magnifying assembly with the cover assembly in the retracted position, illustrating a protrusion of a switch assembly in a first position.
Figure 5:
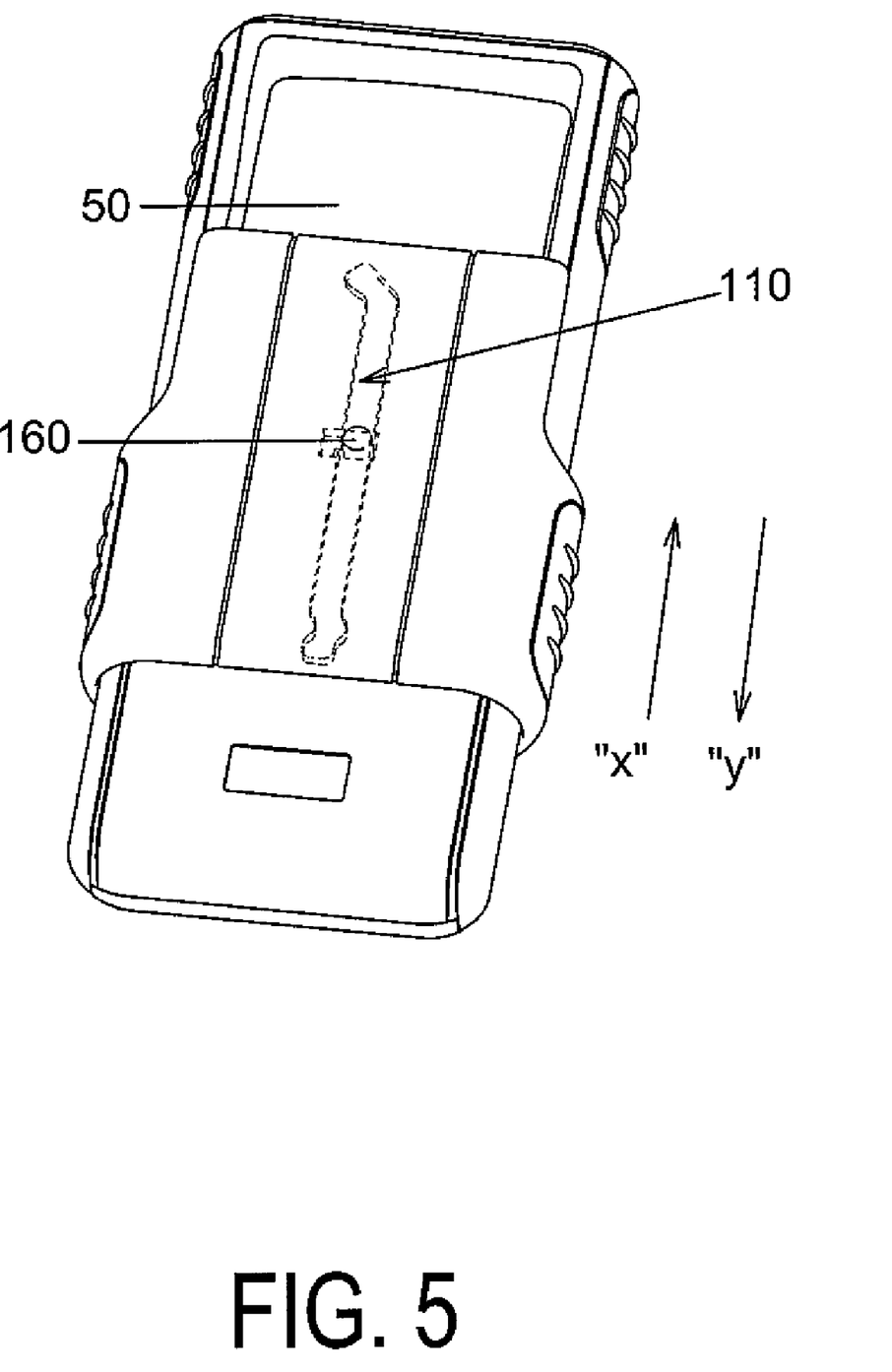
FIG. 5 is a perspective view of a magnifying assembly with the protrusion having been urged and positioned into a second position by the sliding of the cover assembly from the position illustrated in FIG. 4 to a position whereby the magnifying lens is being (at least partially) covered.
Figure 6:
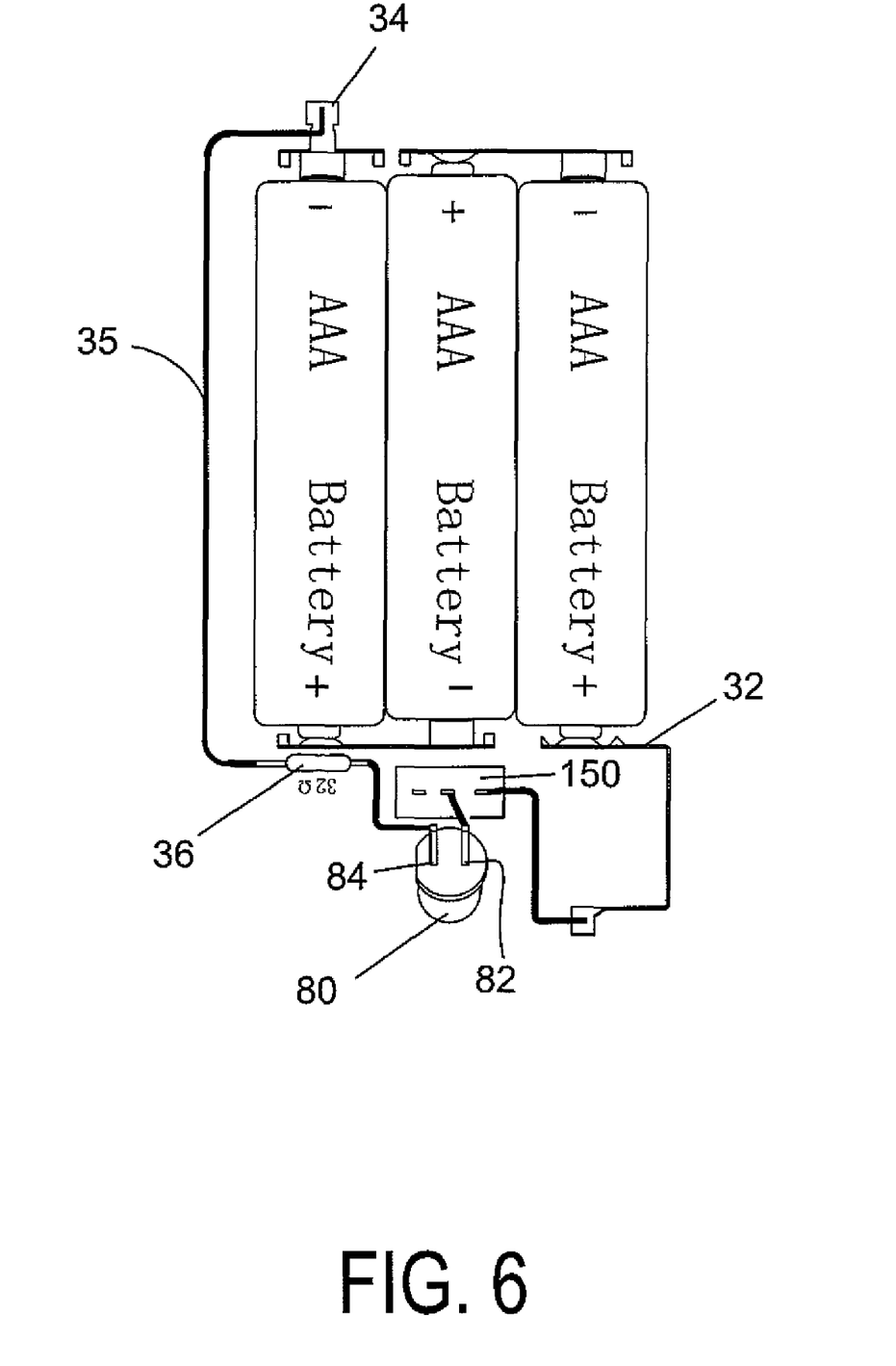
FIG. 6 illustrates a preferred electrical coupling of the power source (e.g. batteries) to an illuminating device (e.g. LED)
Figure 7:
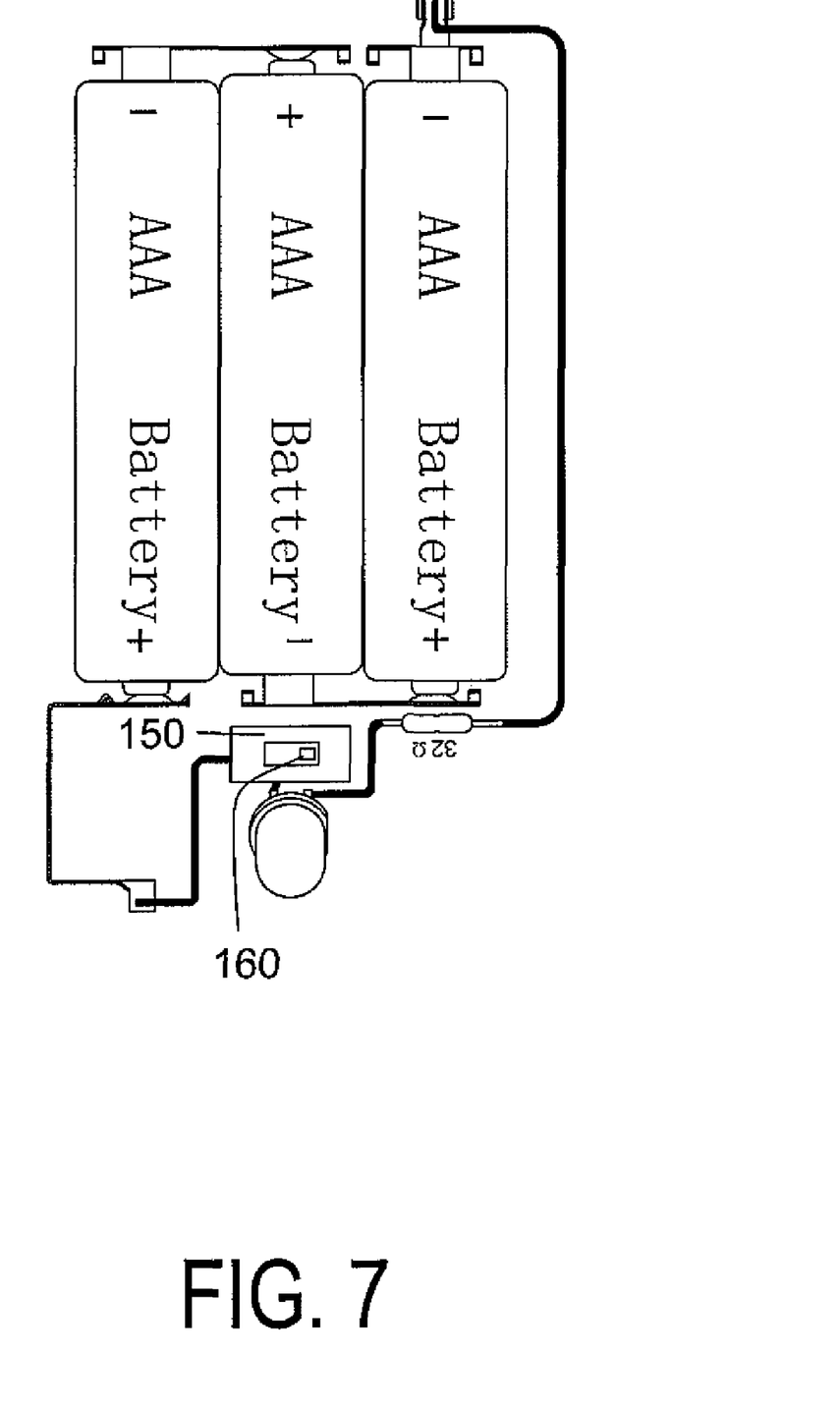
FIG. 7 illustrates the electrical coupling of FIG. 6 from an opposite side.

Protrusion 160 extends into elongated slot 110, as illustrated by the dotted lines in FIGS. 2, 4, 5. The figures also illustrate how elongated slot is angled or otherwise dimensioned to position the protrusion into the first position (i.e. FIG. 4) when cover assembly 60 is in a retracted position (FIGS. 1, 4) so as to expose the magnifying lens and to urge and position protrusion 110 into the second position (e.g. FIG. 5) when cover assembly 150 slides relative to the housing in the first direction ("x") so as to cover at least part of the magnifying lens. FIG. 3 illustrates that in a preferred embodiment; elongated slot 110 does not extend all the way through cover plate 100, but rather is just "deep" enough to permit protrusion 160 to extend therein. This construction provides for an aesthetically pleasing look for cover assembly 60. The foregoing assembly provides that when cover assembly 60 is in the retracted position (e.g. FIGS. 1 and 4) so as to expose magnifying lens 50, the light may be ON, and when cover assembly 60 moves in the direction of arrow "x" (e.g. FIGS. 5 and 2) so as to begin to cover magnifying lens 50, the light will shut OFF.

It should be understood that the foregoing electrical arrangement is only one such possibility, and various arrangements for illuminating an LED are within the scope of this invention and the skill of the ordinary artisan. As but one simple alternative, first light terminal 82 may be electrically coupled to first source terminal 32, such as, for example, via a conductive element and a resistor element, and thus to complete the electrical circuit, a switch assembly may be provided for electrically coupling (and decoupling) second source terminal 34 and second light terminal 84. Also, the particular positions of the protrusion may be reversed etc, depending merely on design choice. It is also by way of design choice the length of protrusion 160 and whether the elongated slot 110 extends all the way through cover plate 100.

Cover assembly 60 may also include a plurality of non-slip rubber members on the inner side surface(s) thereof to provide a suitable amount of friction to assist in preventing an unnecessary or undesirable slipping of cover assembly 60 along housing 20. Furthermore, in a preferred embodiment, cover assembly 60 is comprised of plastic. And lastly, to be sure, it should be evident that cover assembly 60 encases housing 20 as illustrated so that part of housing 20 passes through cover 60 as the cover slides in the first and second directions. The foregoing statement is made so as to provide the broadest reasonable interpretation to understand how cover 60 is coupled "to," "with" and/or "on" housing 20. Magnifying lens 50 may be positioned in housing halves that comprise housing 20 as would be understood by those designing such molds. Non-slip rubber pads 170 may also be provided to assist in gripping of magnifying assembly 10. Other pads or plates, such a front plate 180, may also be provided and formed of plastic, although rubber could also be used therefor if desired.

It can thus be seen that the present invention is advantageous in that it provides an improved magnifying assembly that includes a retractable cover assembly so as to expose the magnifying lens, while maintaining a minimal requirement of the size of the magnifying assembly itself. Additionally, it can be seen that the present invention provides an improved magnifying assembly that includes a retractable cover assembly so as to expose the magnifying lens, thereby reducing the number of moving parts and reducing the likelihood of breakage or malfunction of the assembly. Still further, as disclosed, the present invention can be manufactured relatively inexpensively and easily using, for example, plastic materials where appropriate.

Lastly, in the preferred embodiment, the lens has 2×-3× magnification, although surely other particular ranges or specific magnifications are contemplated and well within the purview of the skilled artisan.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

As but another example and in yet an alternative embodiment of the present invention, the magnifying lens need not be placed in the frame as set forth above. For example, the lens may be "rimless" and merely be coupled to the housing by a plastic coupling member or a screw, just to name but two of many examples. The important point therefore is that the magnifying lens does not move relative to the housing, such as the battery compartment, regardless of how the lens may be coupled and/or secured to the housing. Again, and in accordance with a preferred embodiment and advantageous feature of the invention, the distance between the battery compartment relative to the magnifying lens remains the same regardless of whether the cover assembly slides relative to the housing in the first direction so as to cover at least part of the magnifying lens or slides relative to the housing in the second direction so as to expose the magnifying lens. Such is to be contrasted with the prior art devices whereby the lens may "pop-up" relative to the battery compartment and/or housing.

It should also be understood that the following claims are intended to cover all of the generic and specific features of the invention described herein and all statements of the scope of the invention that as a matter of language might fall therebetween.

What is claimed is:

1. A magnifying assembly, the magnifying assembly comprising:
    a housing comprising:
        a frame to which a magnifying lens is secured; and
        a battery compartment;
    a cover assembly, wherein the cover assembly comprises a plate with a slot communicating with protrusion and wherein the cover assembly is slidable linearly along the housing;
    wherein the cover assembly is slidable linearly relative to the housing in a first direction so as to cover at least part of the magnifying lens and slidable linearly relative to the housing in a second direction so as to expose the magnifying lens;
    wherein the distance between the battery compartment relative to the magnifying lens remains the same regardless of whether the cover assembly slides linearly relative to the housing in the first direction so as to cover at least part of the magnifying lens or slides linearly relative to the housing in the second direction so as to expose the magnifying lens; and
    wherein an overall length and width of the magnifying assembly does not increase when the cover assembly slides from a position where the cover assembly is covering at least part of the magnifying lens to a position so as to expose the magnifying lens.

2. The magnifying assembly as claimed in claim 1, wherein the magnifying lens is secured within the frame and wherein the frame and battery compartment are integrally formed.

3. The magnifying assembly as claimed in claim 2, wherein the housing is formed of plastic and the frame and the battery compartment are integrally formed from molded plastic.

4. The magnifying assembly as claimed in claim 1, comprising:
    an illumination device, coupled to the housing, wherein the illumination device is coupled to first and second light terminals;
    wherein the battery compartment comprises first and second source terminals;
    wherein the second light terminal is electrically coupled to the second source terminal; and
    a switch assembly for electrically coupling the first source terminal and the first light terminal, wherein the switch assembly comprises a protrusion;
    wherein the cover assembly comprises a cover plate having an elongated slot into which the protrusion extends, and the elongated slot is dimensioned to:
    position the protrusion into a first position when the cover is in a retracted position so as to expose the magnifying lens, and
    position the protrusion into a second position when the cover slides relative to the housing in the first direction so as to cover at least part of the magnifying lens.

5. The magnifying assembly as claimed in claim 1, comprising:
    an illumination device, coupled to the housing, wherein the illumination device is coupled to first and second light terminals;
    wherein the battery compartment comprises first and second source terminals;
    wherein the first light terminal is electrically coupled to the first source terminal; and
    a switch assembly for electrically coupling the second source terminal and the second light terminal, wherein the switch assembly comprises a protrusion;
    wherein the cover assembly comprises a cover plate having an elongated slot into which the protrusion extends, and the elongated slot is dimensioned to:
    position the protrusion into a first position when the cover is in a retracted position so as to expose the magnifying lens, and
    position the protrusion into a second position when the cover slides relative to the housing in the first direction so as to cover at least part of the magnifying lens.

6. The magnifying assembly as claimed in claim 4, wherein:
    when the protrusion is in the first position the first source terminal is electrically coupled to the first light terminal, and
    when the protrusion is in the second position the first source terminal is electrically decoupled from the first light terminal,
    whereby when the protrusion is in the first position the illumination device illuminates and when the protrusion is in the second position the illumination device is not illuminated.

7. The magnifying assembly as claimed in claim 1, wherein the cover plate is integrally formed with the cover assembly.

8. The magnifying assembly as claimed in claim 7, wherein the cover assembly is comprised of plastic.

9. The magnifying assembly as claimed in claim 1, wherein the cover assembly encases the housing so that that part of the housing passes through the cover as the cover slides in the first and second directions.

10. The magnifying assembly as claimed in claim 1, where when the magnifying lens is exposed, the cover is positioned over the battery component.

11. The magnifying assembly as claimed in claim 1, wherein the plate is releasably coupled to the cover assembly.

12. The magnifying assembly as claimed in claim 11, wherein the plate is snap-fit onto the cover assembly.

13. The magnifying assembly as claimed in claim 1, wherein the plate is integrally formed with the cover assembly.

* * * * *